Figure 7:
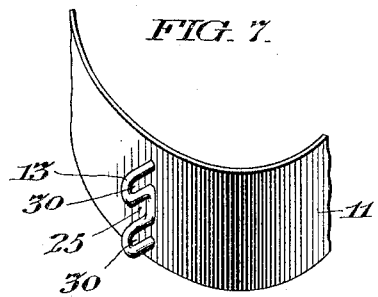

June 22, 1926.
E. H. ANGLE
1,589,782
ORTHODONTIC APPLIANCE
Filed Dec. 15, 1925 2 Sheets-Sheet 1
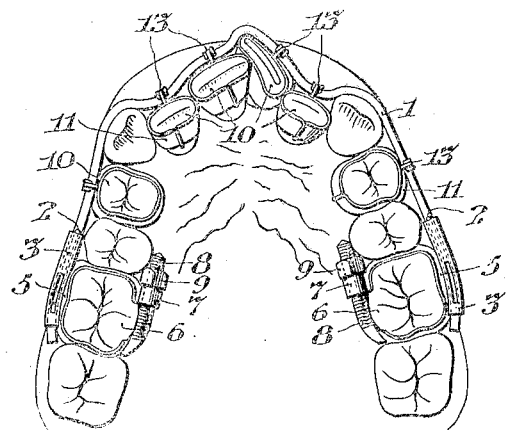
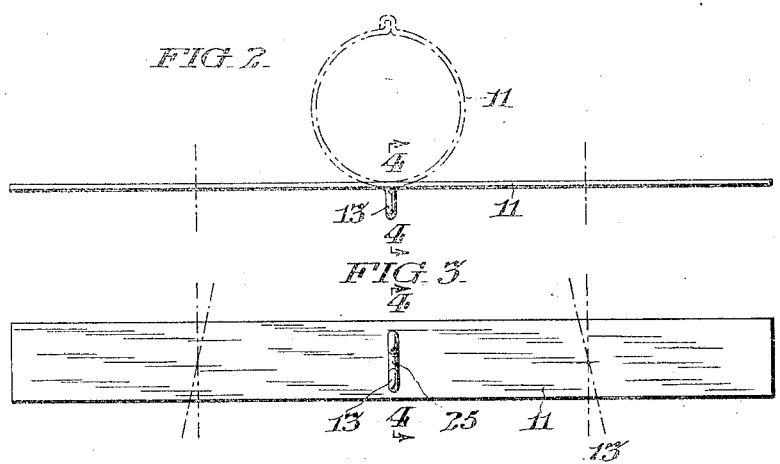
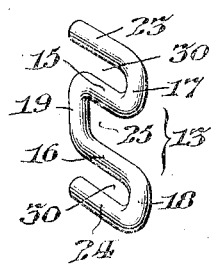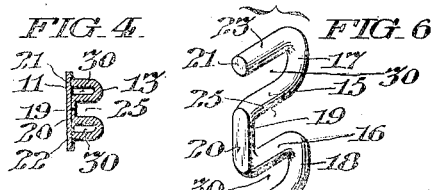
Inventor
Edward H. Angle,
By Clifton C. Hallowell
Attorney June 22, 1926.

E. H. ANGLE 1,589,782

ORTHODONTIC APPLIANCE

Filed Dec. 15, 1925    2 Sheets-Sheet 2

Inventor
Edward H. Angle,

By Clifton C. Hallowell
Attorney

Patented June 22, 1926.

1,589,782

UNITED STATES PATENT OFFICE.

EDWARD H. ANGLE, OF PASADENA, CALIFORNIA.

ORTHODONTIC APPLIANCE.

Application filed December 15, 1925. Serial No. 75,503.

My invention is applicable to the art of correcting the position of malposed teeth of the dental arch, and particularly relates to that class of devices in which an arch-bar is adjustably supported at its opposite terminals by anchorages clamped to suitably disposed posterior teeth or molars, and is especially directed to the means by which said arch-bar is connected, intermediate of its ends, with selected teeth of the dental arch.

The principal objects of my invention are to provide a tooth engaging band with an arch-bar attaching bracket of such proportions and of such reduced bulk, or size, as to afford a minimum interference with the lips and cheeks, whereby a consequent lessening of discomfort and inconvenience to the wearer is effected.

Other objects of my invention are to provide the tooth-band with a bracket that is so constructed and arranged as to afford such a reinforcement for said band as to require no supplemental stiffening or thickening of the tooth-band as has been commonly employed.

My invention comprehends an arch-bar attaching bracket, the construction of which is ideally adapted to be conveniently soldered to the tooth-band, and affords such a convenient attachment that the arch-bar may be readily engaged therewith.

Further objects of my invention are to provide a tooth-band with a bracket having means cooperative to so firmly lock an arch-bar therein as to insure the firm, accurate and positive movements of either the crown or root of a tooth in any desired direction, and thereby so facilitate the cooperative action of the arch-bar that it may as readily effect the movement of teeth lingually, labially and buccally, or they may be rotated or tipped transversely with respect to their axes, and may be as readily forced laterally in the direction of the length of the arch-bar with equal accuracy of movement.

The form of my invention as hereinafter described, comprises a tooth-band provided with a bracket formed of wire, shaped into the form of a double-looped staple having the adjacent legs joined to afford a recess or slot opening outwardly and arranged to receive an arch-bar snugly fitted therein, the loops of the staple heads forming spaced apertures disposed upon opposite sides of said arch-bar recess, and arranged to afford eyes or guides through which the ends of a looped ligature, forming a retaining lock, may be passed and so twisted as to draw the ligature loop taut about the arch-bar and thereby firmly lock it in its recess in said bracket.

My invention also includes all of the various novel features of construction and arrangement as hereinafter more definitely specified.

Figure 8:
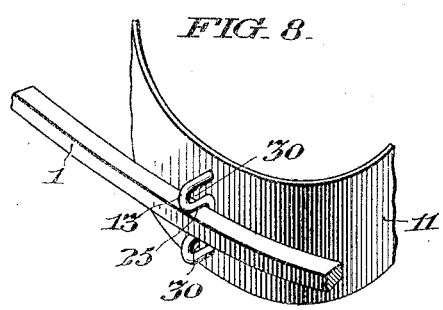
Figure 9:
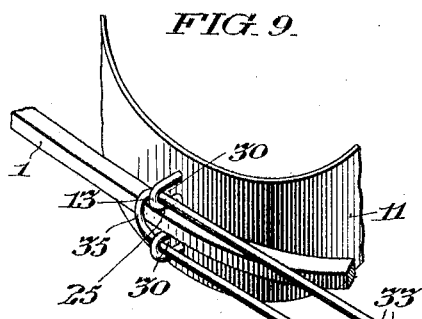
Figure 10:
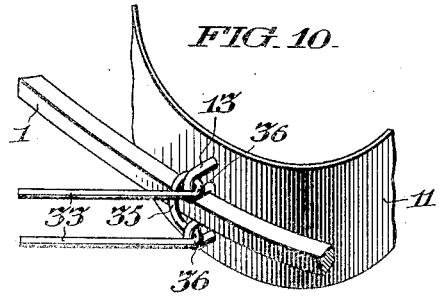
Figure 11:
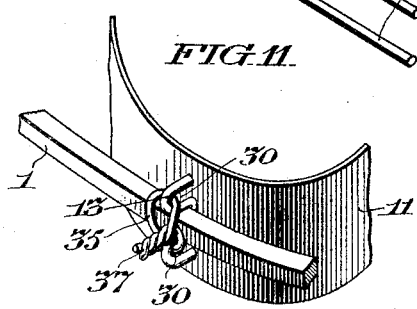
Figure 14:
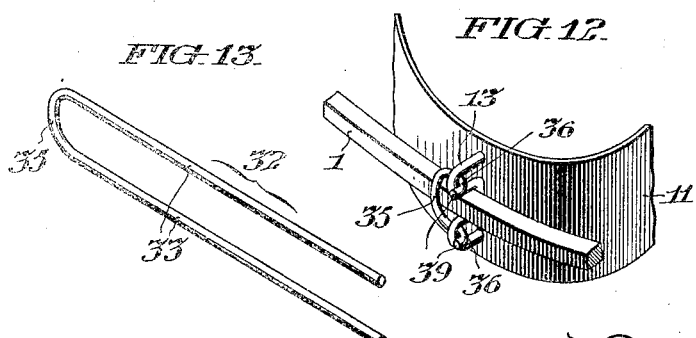
Figures 12, 13:

In the accompanying drawings, Figure 1 is an inverted plan view of the upper human dental arch, showing a convenient embodiment of my invention attached to selected teeth of said dental arch; Fig. 2 is an enlarged plan view of one of the tooth attachments comprising a tooth-band extended in a plane and an arch-bar attaching bracket, constructed according to my invention, attached thereto; Fig. 3 is a front elevational view of the tooth attachment shown in Fig. 2; Fig. 4 is a transverse sectional view of said tooth attachment, taken on the line 4—4 in Figs. 2 and 3; Fig. 5 is a greatly enlarged perspective view of the bracket per se, which is shown attached to the tooth-band in Figs. 2, 3 and 4; Fig. 6 is another greatly enlarged perspective view of the bracket per se, which is shown in Fig. 5 but so positioned as to show the attaching surfaces which are arranged to engage the tooth-band; Fig. 7 is an enlarged fragmentary perspective view of the formed tooth-band with its arch-bar attaching bracket secured thereto; Fig. 8 is a perspecitve view similar to Fig. 7, but showing a fragment of the arch-bar operatively engaged in the attaching bracket; Fig. 9 is a perspective view similar to Fig. 8, but showing the wire ligature forming the lock, looped over the arch-bar, and its ends passed through the eyes forming guiding apertures in the attaching bracket and extended therefrom in alinement with said apertures and in position to effect the drawing of the loop taut; Fig. 10 is a perspective view similar in Fig. 9, but showing the free ends of the looped wire ligature drawn backwardly to form loop retaining bends therein; Fig. 11 is a perspective view similar to Fig. 10, but showing the free ends of the looped wire ligature twisted to exert tension on the loop and thereby so rigidly lock the arch-bar as to prevent its relative movement with respect to the bracket; Fig. 12 is a perspective view similar to Fig. 11, but showing the twisted ends of the wire ligature clipped off, leaving the laterally bent projecting ends of the wire ligature to hold the loop under tension; Fig. 13 is a perspective view of the looped wire ligature in the form best adapted to be conveniently engaged with the bracket; and Fig. 14 is a perspective view of the wire ligature lock per se, in its ultimate form as shown in Fig. 12, to retain the arch-bar in locked engagement with the bracket.

The tooth regulating appliance to which this invention is especially applicable is indicated in a general way in Fig. 1, and includes together with associated parts, an arch-bar 1 bent to substantially conform to the dental arch and having its extremities provided with tangs 2 and extended through anchor sheaths 3, with which said tangs may be engaged to retain the arch-bar 1 in adjusted position, and which are carried by the anchor-bands 5, of well known construction.

As shown in Fig. 1, the anchor bands 5 are attached to the first molar teeth 6, which serve as anchor abutments upon opposite sides of the dental arch, said bands being provided with an eye 7 at one end, and at the other end, a threaded stem 8 extended through said eye and arranged to be adjusted therein by the nut 9 to clamp the band 5 upon said abutment teeth 6, as is obvious.

The gist of my invention resides in the means of securing the arch-bar 1 to the malposed teeth 10 in the dental arch, and comprises the tooth-band 11 and its arch-bar attaching bracket 13, shown in Figs. 2 and 3 in its initial form extended in a plane, and arranged to be cut to the length desired as indicated by the transverse dot-and-dash lines or the oblique dash lines thereon shown, and formed into the tooth embracing ring as shown by the circular dot-and-dash lines as indicated in Fig. 2.

As best shown in Figs. 4, 5 and 6, the bracket 13 is formed of wire, bent to form a double looped staple having the adjacent legs 15 and 16 of the respective loops 17 and 18 joined by the connecting bar 19, which, as best shown in Fig. 6, may preferably be flattened to afford an attaching surface 20 in a plane with the end surfaces 21 and 22 of the outer legs 23 and 24 respectively of the bracket 13, all of which surfaces 20, 21 and 22 are arranged to be engaged with the surface of the tooth-band and be soldered thereto as shown.

The wire bracket thus formed provides a deeply depressed recess 25 which in effect affords a slot extending transversely through the bracket in parallel relation to the length of the tooth-band 11, and the connecting bar 19 may be so flattened as to afford but a relatively thin web, sufficient only to insure the required rigidity, yet permitting the arch-bar to so closely approach the tooth-band 11 as to conserve space and thereby minimize the extent of projection of the regulating appliance from the teeth in the mouth of the patient.

The staple loops 17 and 18 of the bracket 13 afford elongated eyes or guides 30 through which the ends of the arch-bar lock 31 may be threaded, said arch-bar lock comprises a piece of ligature wire 32 shaped in the form of a staple or hairpin having legs or prongs 33 extending parallel from the loop 35 which may be drawn taut over the arch-bar to provide a lock therefor arranged to retain it rigidly engaged with said brackets as shown in Fig. 9.

As shown in Fig. 7, the slot or recess 25 in the bracket 13, opens outwardly from the tooth-band and consequently affords convenient access thereto for the easy manipulation of the arch-bar with respect thereto, irrespective of the shape and position of said arch-bar which is shown engaged in the slot in Fig. 8.

As shown in Fig. 9, the arch-bar thus adjusted is engaged by the loop 35 of the lock structure shown in Fig. 13, the legs 33 being threaded through the eyes or apertures 30 and pulled in the direction of their free extremities to draw the loop 35 taut over the arch-bar as indicated.

As shown in Fig. 10, the legs 33 of the lock structure are turned backwardly to form the loop retaining bends 36, and in this position the parallel strands of the wire ligature are twisted together to form in effect a tourniquet 37 as shown in Fig. 11, and thereby further tighten the loop 35 and the retaining bends 36.

As shown in Fig. 12, the twisted strand 37 is clipped substantially flush with the outer face of the arch-bar, thereby leaving the outwardly extending retaining prongs 39, of the arch-bar retaining lock which is more clearly illustrated separately in Fig. 14.

My invention is advantageous in that the bracket serves as a reinforcement affording a maximum solder attaching surface, and provides a uniform three-surface engagement with the arch-bar, which snugly fits therein, and which may be readily shaped and adjusted to engage therewith from the outer side thereof.

Furthermore, the bracket attachment affords such a positive locking means comprising the ligature wire lock, that said arch-bar may be so rigidly engaged with the bracket as to insure an ideal torque power in any desired direction, whereby the movement of the tooth roots either labially or lingually, and the tipping mesially or distally of the crown and roots, as well as the rotation of the tooth, may be effected with equal facility. In fact, every possible desired movement of the teeth may be readily accomplished thereby.

Although I have shown and described the tooth-band bracket structure as formed of wire which is cylindrical in cross-section, it is to be understood that said wire may be square or flat ribbon-like or any other desired form and, therefore, I do not desire to limit my invention to the precise details of construction and arrangement as herein set forth, as it is obvious that various modifications may be made therein without departing from the essential features of my invention as defined in the appended claims.

Having thus described my invention, I claim:

1. An orthodontic appliance comprising a tooth-band bracket formed of wire bent to provide an arch-bar receiving recess, and to afford apertures disposed upon opposite sides of said recess.

2. An orthodontic appliance comprising a tooth-band bracket formed of wire bent into the form of a double looped staple and arranged to provide an arch-bar receiving recess between the respective loops.

3. An orthodontic appliance comprising a tooth-band bracket formed of wire bent into the form of a double looped staple having the adjacent legs of the respective loops joined to afford an attachment and arranged to provide an arch-bar receiving recess between said adjacent legs.

4. An orthodontic appliance comprising a tooth-band bracket formed of wire bent into the form of a double looped staple having the adjacent legs of the respective loops joined to afford an attachment arranged to be engaged with a tooth-band, and disposed in a plane with the ends of the outermost legs of the staple structure.

5. An orthodontic appliance comprising a tooth-band bracket formed of wire bent into the form of a double looped staple having the adjacent legs of the respective loops joined to provide a bar flattened to afford an attachment and arranged to provide an open-sided recess embraced by the flattened bar and said adjacent legs.

6. An orthodontic appliance comprising a tooth-band bracket formed of wire bent into relatively parallel staple-shaped formation affording spaced apertures disposed upon the opposite sides of an outwardly opened recess arranged to receive an arch-bar.

7. An orthodontic appliance comprising a tooth-band bracket formed of wire bent into relatively parallel staple-shaped formation affording spaced apertures disposed upon the opposite sides of an outwardly opened recess arranged to receive an arch-bar, and a lock formed of a wire ligature and comprising a loop having prongs extended through said apertures and bent into cooperative engagement with the bracket structure to retain said loop taut over an arch-bar disposed in said recess.

8. An orthodontic appliance comprising a tooth-band provided with an arch-bar attachment comprising a looped wire structure having an arch-bar receiving recess opening outwardly from said tooth-band and having spaced apertures disposed upon opposite sides of said recess, and a lock formed of ligature wire, arranged to rigidly retain an arch-bar in said recess, and comprising a loop having prongs extended through said apertures and bent into cooperative engagement with said attachment to retain the loop of said ligature wire taut over said arch-bar.

9. An orthodontic appliance comprising a tooth-band provided with an arch-bar attachment comprising a looped wire structure having an arch-bar receiving recess opening outwardly from said tooth-band and having apertures spaced from the opposite sides of said recess and extended substantially parallel therewith, and a lock formed of wire ligature and shaped to afford a loop arranged to embrace an arch-bar in said recess, and having prongs respectively extended through said apertures, arranged to be bent back and twisted to, in effect, afford a tourniquet.

10. An orthodontic appliance comprising a tooth-band bracket comprising a looped wire structure having an arch-bar receiving recess opening outwardly from said tooth-band, and having lock-receiving guides spaced from said recess upon opposite sides thereof extended in parallel relation therewith, with which an arch-bar engaging lock may be engaged.

In witness whereof, I have hereunto set my hand this 9th day of December, A. D., 1925.

EDWARD H. ANGLE.